INVENTOR.
John J. Dutko and
Henry A. Seesselberg
ATTORNEY

INVENTOR.
John J. Dutko and
Henry A. Seesselberg
BY
ATTORNEY

United States Patent Office 3,544,874
Patented Dec. 1, 1970

3,544,874
INHIBIT TRIGGER CIRCUIT TO PREVENT SIMULTANEOUS CONDUCTION OF CONTROLLED RECTIFIERS DUE TO IMPROPERLY SPACED COMMAND SIGNALS
John J. Dutko, North Plainfield, and Henry A. Seesselberg, South Plainfield, N.J., assignors to The Singer Company, New York, N.Y., a corporation of New Jersey
Filed Jan. 21, 1969, Ser. No. 792,451
Int. Cl. H02p 3/12
U.S. Cl. 318—380                     4 Claims

ABSTRACT OF THE DISCLOSURE

A circuit is disclosed for controlling the starting, running and stopping of a D.C. motor fed from an A.C. voltage in which alternatively a start and a stop command signal is applied to respective drive and brake controlled rectifiers (SCR's) to trigger them into conduction to supply respectively a driving direct current or a dynamic braking current for the motor. A special circuit is disclosed for inhibiting the triggering of one controlled rectifier until the other controlled rectifier has turned off to prevent simultaneous triggering of both rectifiers if command signals are not spaced properly. An RC delay circuit provides a definite time delay for delaying the triggering of the brake controlled rectifier until some time after the stop command signal is applied. A monostable multivibrator triggered into its quasi-stable state by the same trigger pulse which triggers the brake controlled rectifier into conduction provides an inhibit signal to prevent triggering of the drive controlled rectifier by said start command signal until the multivibrator has reverted to its stable state.

BACKGROUND OF THE INVENTION

Figure 1:
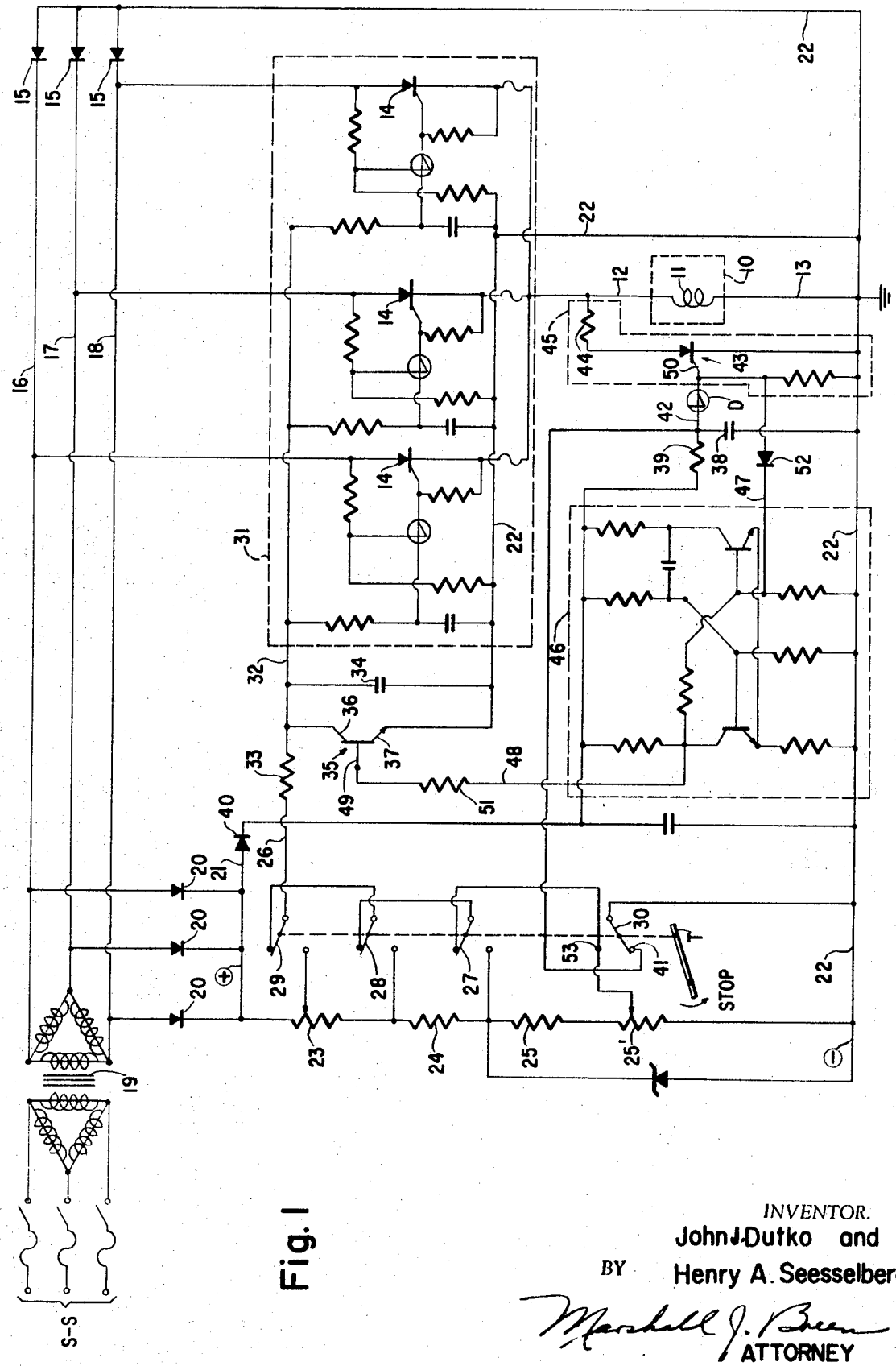

An electrical drive system for sewing machines is shown and described in the copending U.S. application Ser. No. 787,797, filed Dec. 30, 1968 and assigned to the same assignee as the present application. This system utilizes a circuit for controlling the starting, running and stopping of a D.C. motor fed from an A.C. voltage in which alternatively a start and a stop command signal is applied to respective drive and brake controlled rectifiers (SCR's) to trigger them into conduction to supply respectively a driving direct current or a dynamic braking current for the motor. If the command signals are applied at properly spaced intervals so that one controlled rectifier can turn off before the other rectifier turns on the performance is satisfactory. However, with the circuit as disclosed in the above noted application, it is possible to apply to trigger pulse to the brake SCR so soon after removal of the start signal that the rectifiers conduct simultaneously and this results either in the blowing of fuses or in the destruction of the controlled rectifiers or the trigger diodes. It is also possible to apply the trigger pulse to the drive SCR's so soon after removal of the stop signal that the rectifiers conduct simultaneously with the same adverse result as above.

It is therefore desirable to provide means for preventing the simultaneous conduction of the drive and brake SCR's regardless of how closely in time the command signals are applied and the circuit of the present invention has been devised to provide this important function.

SUMMARY OF THE INVENTION

It is therefore a primary object of this invention to provide effective circuit means for inhibiting the triggering into conduction of a first SCR until a second SCR has turned off even though the turn-on command for the first SCR is initiated before the second SCR has turned off.

In seeking a solution to this problem it has been found according to this invention that a simple RC time delay circuit will suffice for delaying the triggering of the brake SCR for a definite time after the removal of the triggering voltage from the drive SCR's. Specifically the triggering voltage for the brake SCR is derived by charging a capacitor through a resistance from a constant D.C. voltage. When the stop command is initiated a switch removes a short-circuit from the capacitor and allows the capacitor to start charging towards the D.C. voltage which later fires a threshold diode to supply a triggering pulse to the brake SCR. The RC time constant is made sufficiently longer than the maximum time for the drive SCR to commutate off.

A switching transistor is connected to the trigger line for the drive SCR's so that, when this transistor is on, it shorts the trigger line and prevents the application of trigger pulses to the drive SCR's. A monostable multivibrator is triggered to its quasi-stable state by the same pulse which triggers the brake SCR into conduction. The output of the monostable multivibrator turns on the switching transistor to disable the trigger line to the drive SCR's and holds it disabled for the time the multivibrator remains in its quasi-stable state. This time is fixed and made at least equal to the time it takes for the brake SCR to self commutate off by reduction of the anode voltage at near zero motor speed so that the drive SCR's cannot be turned on until the brake SCR is turned off, even, if a drive command is initiated before that time.

In the drawings, FIG. 1 is a complete wiring diagram illustrating an embodiment of the circuit of this invention.

Figure 2:
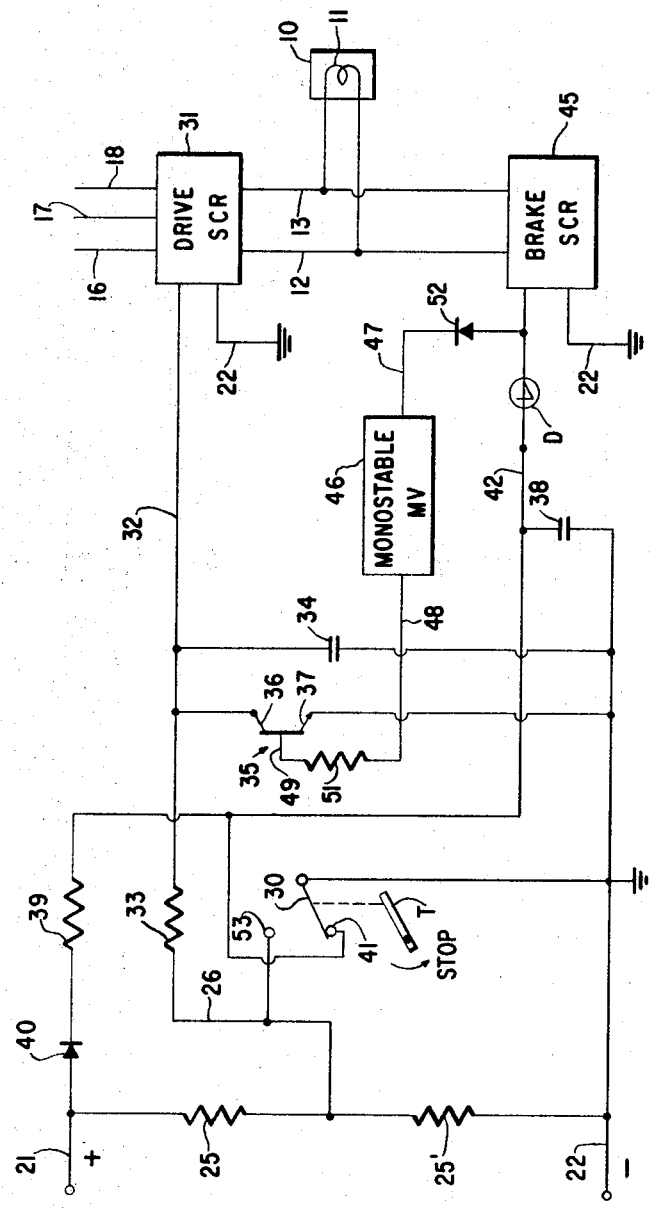

FIG. 2 is a simplified block diagram of the circuit of FIG. 1 and emphasizes the nature and location of the additional circuits of this invention in relation to the rior art circuit.

DESCRIPTION OF THE INVENTION

Referring to FIG. 1, it will be recognized that this circuit is basically similar to that disclosed in the copending U.S. patent application Ser. No. 787,797, except for specific additions and changes made according to this invention and which will be pointed out in detail.

A. D.C. motor 10 has an armature 11 supplied on lines 12 and 13 with direct current controlled by the variable triggering of controlled rectifiers 14 which combine with fixed rectifiers 15 to form a polyphase A.C.–D.C. bridge fed from a polyphase A.C. voltage on lines 16, 17, and 18 obtained from a regular commercial source S—S of polyphase A.C. voltage through a transformer 19.

Fixed rectifiers 20 combined with rectifiers 15 form a polyphase A.C.–D.C. bridge supplying a constant reference D.C. voltage on lines 21 and 22. A voltage divider formed by series-connected resistances 23, 24, 25, and 25' provide a voltage on line 26 which may be increasingly adjusted by operating switches 27, 28, and 29 sequentially under the control of a treadle T The position of the switches shown in FIG. 1 is with the treadle relaxed and it will be understood that depression of the treadle T actuates the switches in the sequence 27, 28, and 29 to apply increasing positive voltage to line 26 in discrete steps to provide discrete increased speeds for the motor 10. The switch 30 is the command switch and in the relaxed position of treadle T as shown, provides a low voltage on line 26 to command the motor 10 to run at low speed. If switch 30 is moved to its other position it will ground line 26 and command the motor 10 to stop by removing a short-circuit from capacitor 38 as will be explained in detail. This command switch 30 may be operated by heeling the treadle T. Thus switch 30 alternatively applies a start or a stop command signal to the system depending on whether the treadle is relaxed or heeled.

The elements enclosed in the dashed rectangle 31 will be referred to collectively as the drive SCR 31. The line 32 will be referred to as the drive trigger line 32 and it will be understood that, when line 32 is energized with a D.C. voltage of sufficient value, the controlled rectifiers 14 will conduct in sequence in synchronism with the A.C. phase sequence on lines 16, 17, and 18 to furnish a direct current drive to the armature 11 of motor 10 as explained in detail in the abovementioned copending application.

Trigger line 32 is connected to line 26 through a series resistance 33 and a capacitor 34 is connected across lines 32 and 22.

A switching transistor 35 has its collector 36 connected to line 32 and its emitter 37 connected to line 22. It will be apparent that if transistor 35 is driven to saturation, the line 32 will be shorted to line 22 and no triggering voltage can be produced to trigger the drive SCR 31 into conduction, even though a command signal is applied to line 26.

A capacitor 38 connected at one end to line 22 is connected at the other end through a series resistance 39 and diode 40 to line 21. The switch 30 is normally closed through contact 41 to provide a short-circuit across the capacitor 38. The switch 30 is actuated to open only by heeling the treadle T. This is the stop command and initiates the controlled charging of capacitor 38 through resistance 39 and diode 40 towards the voltage on line 21. The voltage on the capacitor 38 is applied by line 42 to a threshold diode D which breaks down after a time delay controlled by the RC time constant of resistance 39 and capacitance 38 and furnishes a trigger pulse to the gate 50 of SCR 43. Conduction of the SCR 43 connects a resistance 44 as an electrical load to the armature 11 for dissipating the kinetic energy of the system and provides rapid dynamic braking of the motor 10.

The elements enclosed in the dashed rectangle 45 will be referred to as the brake SCR 45 and the line 42 will be referred to as the brake trigger line 42. It will be understood that the application of sufficient D.C. voltage to line 42 will trigger the brake SCR 45 into conduction.

The elements contained within the dashed rectangle 46 constitute a conventional transistor monostable multivibrator of the type shown and described in detail on page 600 of the textbook "Pulse and Digital Circuits," McGraw-Hill, 1956. It is sufficicent for the purposes of this invention to note that the multivibrator 46 has an input trigger line 47 and an output line 48. Normally the output line 48 is at a low potential of only a small value above the voltage on line 22. However, when a positive trigger pulse is applied to the line 47, the multivibrator switches to its quasi-stable state and the voltage on line 48 goes positive to a value near that on line 21 and remains at that value for a predetermined time until the multivibrator reverts to its stable state at which time the voltage on line 48 returns to its low values.

The output line 48 is connected through resistance 51 to the base 49 of the switching transistor 35 and the input trigger line 47 is connected through diode 52 to the gate 50 of the SCR 43 so that line 47 receives the same trigger pulse as that which triggers the SCR 43 into conduction.

To assist in a better understanding of the operation of this invention, the circuit of FIG. 1 has been simplified to the block diagram form shown in FIG. 2. For easy identification, the same numbers refer to the same elements in both figures. Also a single speed control is shown in FIG. 2 for purposes of simplicity.

OPERATION

Referring to either FIG. 1 or FIG. 2 but more specifically to FIG. 2, the treadle T is in its relaxed position and motor 10 is being commanded to run because the drive trigger line 32 is energized by D.C. voltage supplied through resistance 33 from the voltage on line 26. In this condition, the capacitor 38 is shorted to ground through the closed contact 41 of switch 30 so that no voltage can be supplied to the brake trigger line 42. The monostable multivibrator 46 is in its stable state providing a low voltage near ground level on output line 48 so that the switching transistor 35 is in its off state.

If now it is desired to stop the motor 10, the treadle T is heeled to stop command position as shown by the arrow. This moves switch 30 to the contact 53 and applies ground to line 26 thus removing any voltage on the drive trigger line 32. The drive SCR 31 however, will not turn off immediately due to the latching nature of the SCR but will remain conducting until the end of the conducting half cycle during which the switch 30 is actuated. Thus, if the brake SCR 45 were turned on immediately by the stop command, both the drive SCR 31 and the brake SCR 45 would conduct simultaneously causing the A.C. lines 16, 17 and 18 to supply excessively high current to the braking resistance 44 resulting in blowing of fuses or in destruction of the SCR's.

To prevent this adverse situation, the voltage on the brake trigger line 42 is controlled by the rate at which the capacitor 38 can be charged through resistance 39 from the voltage on line 21. The capacitor 38 begins charging as soon as the stop command by the treadle T moves switch 30 to remove the short-circuit across capacitor 38. Some time later the voltage on line 42 reaches the threshold value of diode D and a trigger pulse is applied to gate 50 to turn on the brake SCR 45 and connect the braking resistance 44 as an electrical load to the armature 11. This time delay is controlled by the RC value of resistance 39 and capacitor 38 and is made slightly longer than the maximum time for the drive SCR 31 to line commutate off. For 60 cycle A.C. voltage on lines 16, 17, and 18 in the circuit shown, the maximum clearing time for the drive SCR 31 is typically 8 milliseconds and the delay time imposed by the RC value above is adjusted to 12 milliseconds. This prevents any possibility of the brake SCR 45 from turning on before the drive SCR 31 has turned off even though a stop command is initiated by treadle T immediately following a start command.

It requires some small but definite time after the brake SCR 45 is triggered into conduction for the motor 10 to be dynamically braked to a speed near zero at which the back E.M.F. supplied by the rotating armature is so low that the current supplied thereby falls below the holding current of the brake SCR 45 and it turns off. For a system using the circuit shown and driving an industrial sewing machine at 6000 r.p.m. this time is typically about 160 milliseconds.

To prevent the drive SCR 31 from being turned on even though commanded to do so, before the brake SCR 45 has turned off the following circuit operation is provided. The trigger pulse furnished by the threshold diode D to turn on the brake SCR 45 is also applied through diode 52 to the input line 47 to the multivibrator 46 casing it to switch from its stable to its quasi-stable state as is well understood in this art. This causes the voltage on the output line 48 to go to a value near that on line 21 and base-biases the transistor 35 to its on or saturated state. This effectively grounds the drive trigger line 32 through the low impedance of the collector-emitter circuit of the transistor 35 thus inhibiting any triggering of the drive SCR 31 even though commanded to do so by relaxing the treadle T from its heeled position.

The monostable multivibrator 46, as is well known, remains in its quasi-stable state only for a predetermined time, which can be established by selecting component values, after which it reverts automatically to its stable state. Thus, if this time is made slightly greater than the time required to turn off the brake SCR, then the drive SCR 31 cannot be turned on until after the brake SCR 45 has turned off. In a typical case where this circuit is used to drive an industrial sewing machine at 6000 r.p.m., this time is adjusted to 160 milliseconds.

As soon as the multivibrator 46 reverts to its stable state (after the brake SCR 45 is surely off) the transistor 35 returns to its cut-off condition and voltage may then be applied to the drive trigger line 32 to trigger the drive SCR 31 into conduction.

The purpose of resistance 33 and capacitor 34 is to prevent the sudden application of full voltage to the drive trigger line 32 from line 26 when the transistor 35 comes out of saturation while the motor is substantially at standstill. Since, in this situation the drive SCR 31 sees only the very low resistance of the armature 11, the instantaneous peak anode current in the absence of resistance 33 and capacitor 34 may be excessive and can exceed the $di/dt$ rating of the SCR. This causes a gate-to-anode junction short in the SCR destroying it.

If, for example, the treadle T is heeled and released in rapid succession, the brake SCR is turned on, line 32 is inhibited from furnishing triggering pulses by saturation of transistor 35 until the multivibrator 46 reverts to its stable state. The motor 10 will be substantially at standstill when the transistor comes out of saturation and, if full voltage were suddenly applied thereby to line 32, the excessive $di/dt$ condition described above may occur. However, according to this invention, the rise of voltage on line 32 is controlled by the charging rate of capacitor 34 through the resistance 33. Therefore the sudden turning off of transistor 35 by the reversion of multivibrator 46 to its stable state does not cause a full firing angle trigger to be applied to the drive SCR 31 but only a succession of trigger pulses starting at a small angle and advancing at an exponential rate to the full angle. By the time this full firing angle is reached, the motor armature 11 has accelerated and has sufficient back E.M.F. to keep the peak voltage across and current through the drive SCR 31 to a reasonable level thus avoiding an excessive $di/dt$ condition.

It will be apparent from the above that, in accordance with this invention, there is provided in a motor control circuit, circuit means for assuring the proper timing between the successive triggering of controlled rectifiers regardless of the timing of command motor start and stop signals to prevent the simultaneous firing thereof, together with circuit means preventing excessive rate of rise of anode current responsive to a motor start command. Improved reliability of operation and reduced component ratings and cost are therefore important attributes of this invention.

While the invention has been described by means of a specific example and in a specific embodiment, it is not intended that it be limited thereto, and obvious modifications will occur to those skilled in the art without departing from the spirit and scope of the invention.

Having thus set forth the nature of this invention what is claimed herein is:

1. In a control system for starting, running and braking a D.C. motor fed from an A.C. voltage source and having drive SCR means for supplying a direct current from said A.C. source for driving said motor and brake SCR means for connecting a dissipative electrical load to said motor for dynamic braking including a drive trigger line for the drive SCR means and a brake trigger line for said brake SCR means, and means alternatively initiating start and stop command signals, means preventing the simultaneous conduction of said drive and brake SCR means comprising:
   (a) means delaying the application of triggering voltage to the brake trigger line for a predetermined time following the initiation of the stop command signal,
   (b) means responsive to the triggering of the brake SCR means to provide an inhibit signal for a predetermined time, and
   (c) means responsive to the inhibit signal for disabling application of voltage to the drive trigger line by the start command signal.

2. Circuit means in accordance with claim 1 including:
   (a) means for limiting the rate of rise of the voltage on the drive trigger line following the termination of the inhibit signal.

3. In a system for controlling the starting, running and stopping of a D.C. motor fed from an A.C. voltage source including a drive SCR, means for triggering the drive SCR to supply direct current to the motor from said A.C. voltage source, a brake SCR, means for triggering the brake SCR to supply dynamic braking current to the motor, and means initiating alternatively a start and a stop comand signal for rendering said triggering means effective, means preventing the simultaneous conduction of said drive SCR and said brake SCR comprising:
   (a) RC circuit means for delaying the triggering of the brake SCR following the initiation of the stop command signal,
   (b) a switching transistor normally biased to cut-off condition,
   (c) a monostable multivibrator triggered to its quasi-stable state responsively to the triggering of the brake SCR,
   (d) means responsive to the output of the multivibrator in its quasi-stable state to switch the transistor into its saturated condition, and
   (e) means responsive to the saturated condition of the transistor to inhibit the triggering of the drive SCR by said start command signal.

4. In a control system for starting a D.C. motor fed from an A.C. voltage source employing a controlled rectifier for supplying a driving direct current to said motor including means responsive to a start command signal for triggering said controlled rectifier, means responsive to an inhibit signal for disabling said triggering by said start command signal comprising;
   (a) a source of D.C. voltage,
   (b) a trigger line for said controlled rectifier connected to an input terminal through a resistance,
   (c) a capacitor connected between said trigger line and ground,
   (d) a transistor normally biased to cut-off condition,
   (e) means responsively to the inhibit signal for switching said transistor from cut-off to saturation,
   (f) means responsively to the saturation of said transistor for applying a low resistance path from said trigger line to ground, and
   (g) means for connecting said input terminal to said source of D.C. voltage responsively to the initiation of said start command signal.

References Cited
UNITED STATES PATENTS
3,188,547 6/1965 Zelina _____ 318—370
3,222,582 12/1965 Heyman et al. _____ 318—139

ORIS L. RADER, Primary Examiner

RICHARD C. CASARI, Assistant Examiner